No. 846,259. PATENTED MAR. 5, 1907.
P. S. SWAN & N. FRASER.
MACHINE FOR MEASURING AND CUTTING CLOTH.
APPLICATION FILED MAR. 26, 1906.

6 SHEETS—SHEET 1.

WITNESSES
Walter Abbr
Paul A Blair

INVENTORS
Peter Smith Swan
Norman Fraser
BY
Howson and Howson
ATTORNEYS

No. 846,259. PATENTED MAR. 5, 1907.
P. S. SWAN & N. FRASER.
MACHINE FOR MEASURING AND CUTTING CLOTH.
APPLICATION FILED MAR. 26, 1906.
6 SHEETS—SHEET 2.
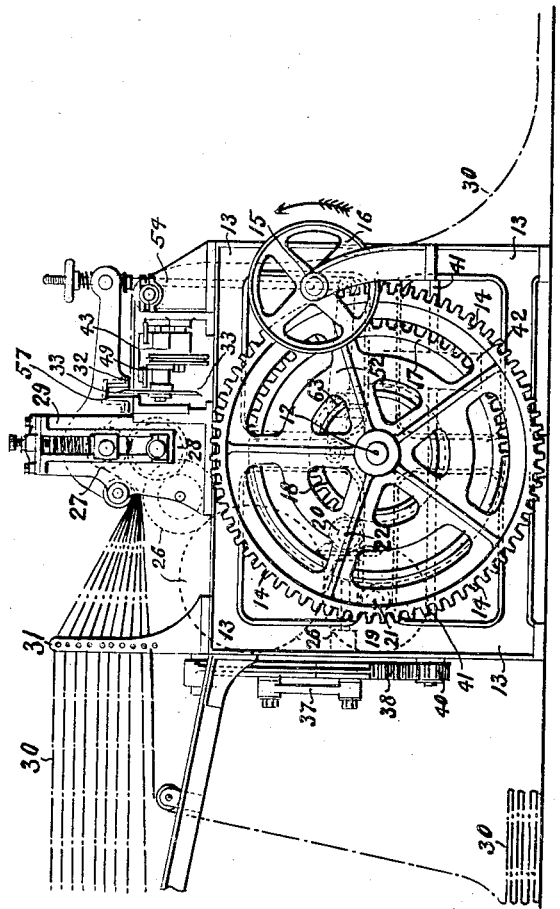
WITNESSES
INVENTORS
Peter Smith Swan
Norman Fraser
BY
Howson and Howson
ATTORNEYS No. 846,259. PATENTED MAR. 5, 1907.
P. S. SWAN & N. FRASER.
MACHINE FOR MEASURING AND CUTTING CLOTH.
APPLICATION FILED MAR. 26, 1906.
6 SHEETS—SHEET 3.
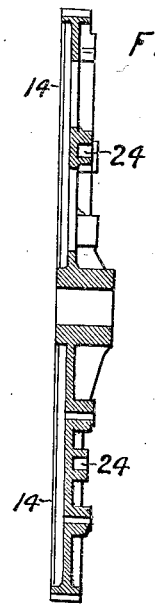
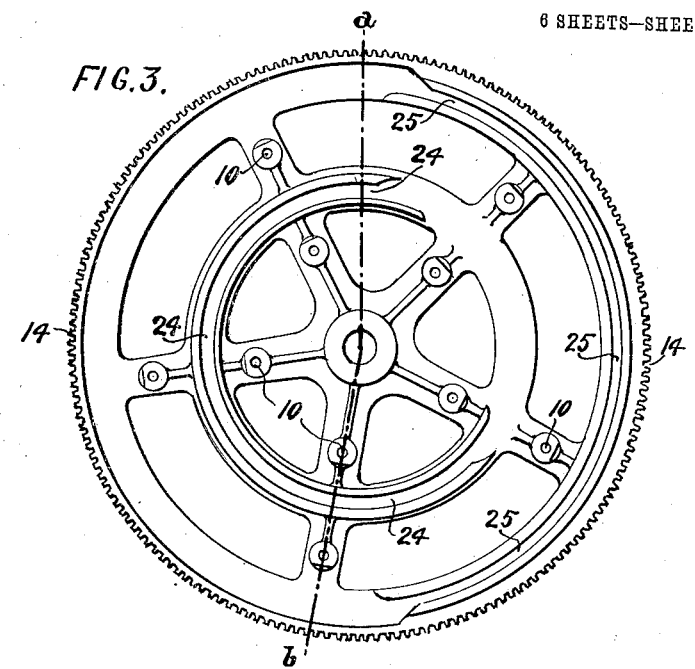
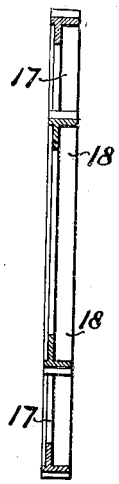
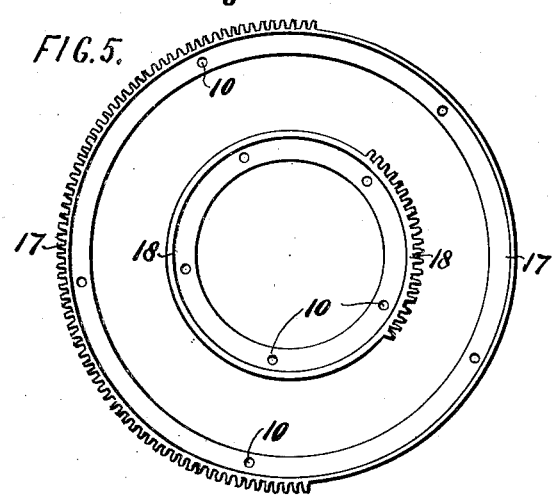
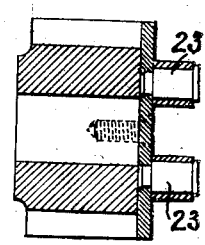
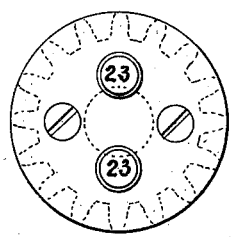
WITNESSES
INVENTORS
Peter Smith Swan
Norman Fraser
BY
Howson and Howson
ATTORNEYS No. 846,259. PATENTED MAR. 5, 1907.
P. S. SWAN & N. FRASER.
MACHINE FOR MEASURING AND CUTTING CLOTH.
APPLICATION FILED MAR. 26, 1906.

6 SHEETS—SHEET 4.

WITNESSES
Walter Abbi
Paul H. Blair

INVENTORS
Peter Smith Swan
Norman Fraser
BY
Howson and Howson
ATTORNEYS

No. 846,259. PATENTED MAR. 5, 1907.
P. S. SWAN & N. FRASER.
MACHINE FOR MEASURING AND CUTTING CLOTH.
APPLICATION FILED MAR. 26, 1906.

6 SHEETS—SHEET 6.

WITNESSES
Walter Abbr
Paul H. Blair.

INVENTORS
Peter Smith Swan
Norman Fraser
BY
Howson and Howson
ATTORNEYS

UNITED STATES PATENT OFFICE.

PETER SMITH SWAN, OF CALCUTTA, INDIA, AND NORMAN FRASER, OF ARBROATH, SCOTLAND.

MACHINE FOR MEASURING AND CUTTING CLOTH.

No. 846,259.      Specification of Letters Patent.      Patented March 5, 1907.

Application filed March 26, 1906. Serial No. 308,136.

*To all whom it may concern:*

Be it known that we, PETER SMITH SWAN and NORMAN FRASER, subjects of the King of Great Britain and Ireland, and residents, respectively, of Calcutta, India, and Arbroath, Scotland, have invented certain new and useful Improvements in Machines for Measuring and Cutting Cloth and the Like, and of which the following is a specification.

This invention relates to machines for measuring and cutting cloth and the like, and has for its object to improve the construction of such machines so that it will be possible to accurately measure and cut a considerable number of superposed thicknesses of cloth at one time in an expeditious and satisfactory manner.

In order that the invention and the manner of performing the same may be properly understood, the accompanying drawings are annexed, in which—

Figure 1:
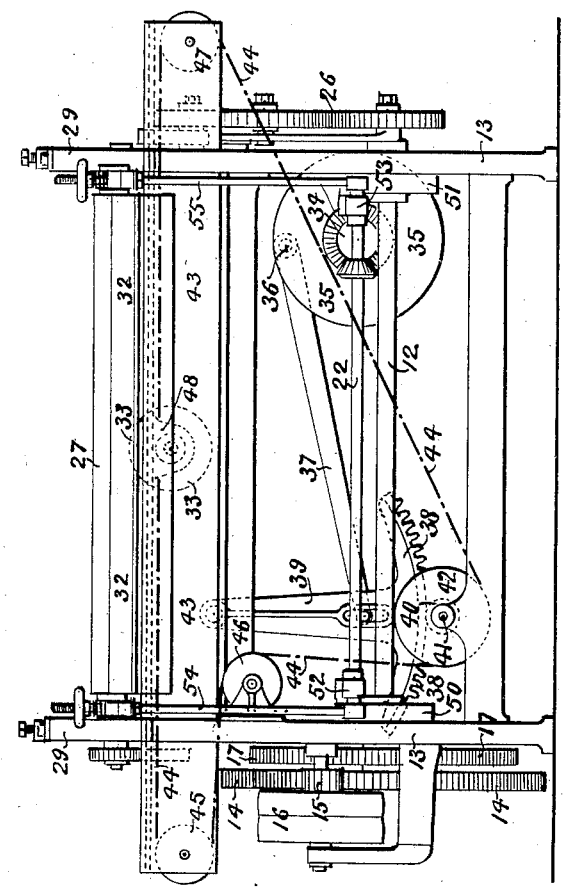
Figure 10:
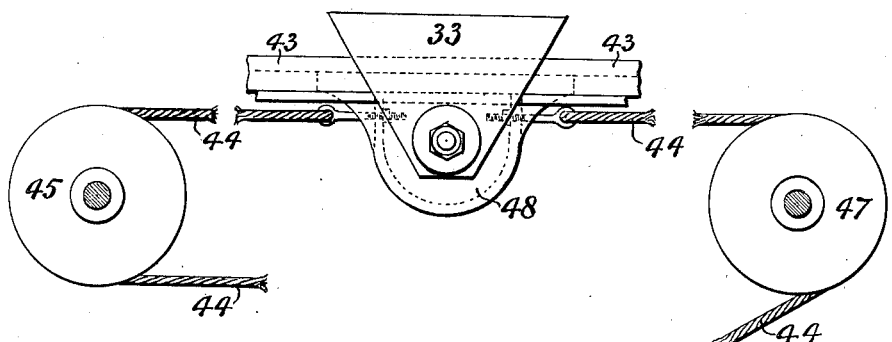
Figure 9:
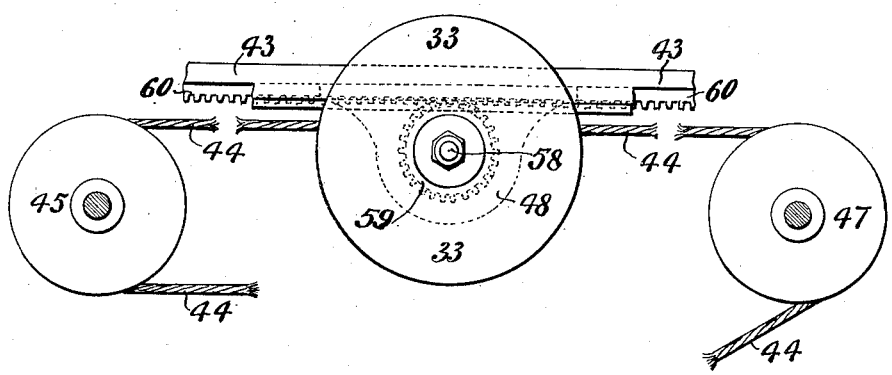
Figure 11:
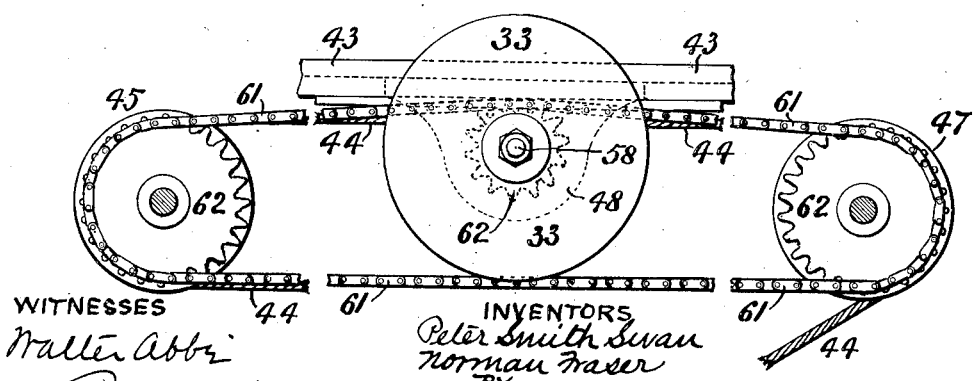
Figure 12:
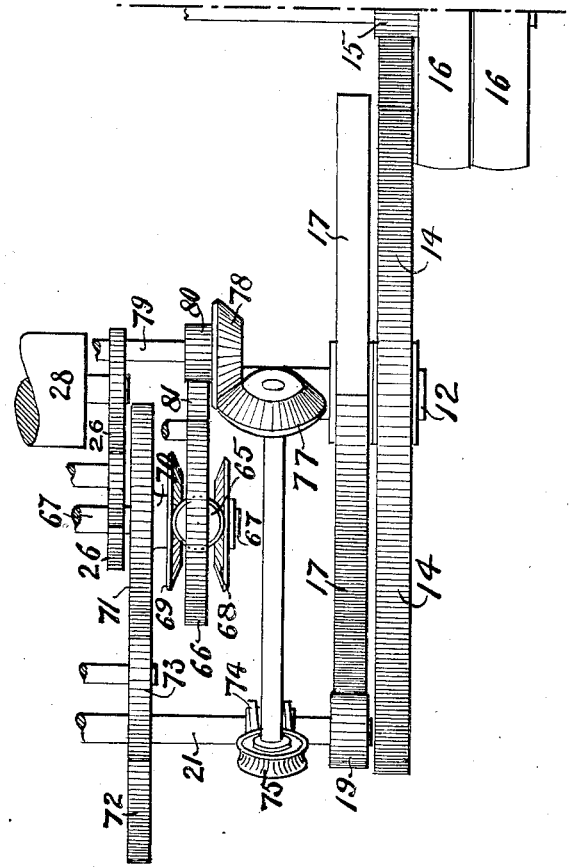
Figure 13:
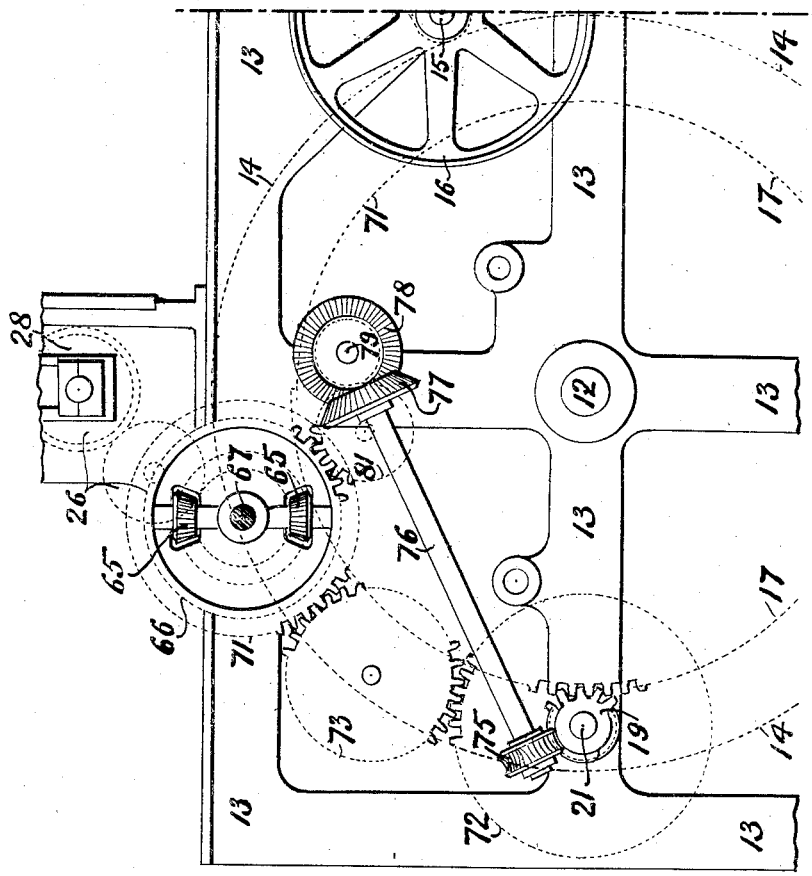

Figure 1 is a front elevation of a measuring and cutting machine in which the invention is incorporated. Fig. 2 is a side elevation of the same. Fig. 3 is a side elevation, on an enlarged scale, of the spur-wheel 14. Fig. 4 is a section of the same on the line $a\ b$, Fig. 3. Fig. 5 is a side elevation of the spur-wheels 17 and 18. Fig. 6 is a transverse section of the same. Fig. 7 is a transverse section of the two pinions 19 and 20 on an enlarged scale. Fig. 8 is an end elevation of the same. Figs. 9 and 10 are elevations of the cutting mechanism. Fig. 11 is a modification of the same. Fig. 12 is a plan view of the change-wheel device. Fig. 13 is an elevation of the same.

In carrying out the invention there is provided a main shaft 12, carried in suitable bearings in the framing 13 of the machine and driven through a spur-wheel 14, pinion 15, and fast and loose pulleys 16 from any convenient source of power, so that the main shaft 12 runs continuously while the machine is working. The spur-wheel 14 is shown separately and to an enlarged scale in side elevation in Fig. 3, Sheet 3, and in transverse section in Fig. 4, the section being taken on the line $a\ b$, Fig. 3, or, instead of the machine being driven by power it may be driven by hand. On the shaft 12 there are also two other spur-wheels in the form of rings 17 18, one within the other (shown separately in side elevation in Fig. 5 and in transverse section in Fig. 6,) these rings being carried on the inner face of the spur-wheel 14 by bolts passed through holes 10 in them and the spur-wheel. The teeth of these wheels 17 18 are interrupted, as shown, so that they give an intermittent motion, as hereinafter described, to two pinions 19 20, one, 19, of which is keyed on and drives a shaft 21, carried in bearings in the framing 13 and actuating the measuring mechanism, the other, 20, being secured to and driving a shaft 22, also carried in bearings in the framing and actuating the cutting mechanism, all as hereinafter described. The two pinions 19 20 are shown to a still further enlarged scale in transverse section in Fig. 7 and in end elevation in Fig. 8. They each carry two studs 23, (or it may be only one stud,) projecting out from its end, the pinions being so geared with their respective spur-wheels 17 18 that the studs 23 can slide in grooves 24 25 concentric with and formed for them in the inner side of the spur-wheel 14. The lengths of these grooves are so proportioned that the pinions 19 20 are held firmly and prevented from revolving while the toothless part of their respective spur-wheels 17 or 18 is passing them. By these means it is insured that the pinions correctly mesh again with the toothed portion of the wheels and resume their motion at the correct time.

The measuring-shaft 21 drives through gearing 26, changeable to permit of different lengths of cloth being measured, measuring-rollers 27 28, carried in bearings in brackets 29, secured to the upper part of the framing 13, so that at each motion of the shaft 21 these rollers pull the desired length of cloth 30 in superposed layers, according to the number of thicknesses which it may be desired to measure off at one time through the usual rack 31, and these rollers 27 28 pass the cloth so measured off over a table 43 and under a presser-bar 32, hinged to the brackets 29 and working in conjunction with a cutting-knife 33 in the form of a disk, as hereinafter described.

The cutting-shaft 22 actuates, through bevel-gear 34, a disk 35, carrying a crank-pin 36, which through a connecting-rod 37 drives a lever 39, centered at its upper end in the framing 13 and carrying a toothed sector 38 on its lower end. The sector 38 gears with a pinion 40, driving a shaft 41, on which is keyed a drum 42, chains or ropes 44 attached to which pass over guide-pulleys 45 46 47, carried by the framing 13 and table 43, to the opposite ends of a saddle 48, carrying the knife 33. This saddle 48 slides in a rail 49 on the under side of the table 43, and the gearing is so proportioned that the knife, which cuts in both directions, makes exactly one stroke to each half-revolution of the crank-pin 36.

The main shaft 12 carries two grooved cams 50 51, which, acting through levers 52 53, centered on pins 63 in the framing and side rods 54 55, raise and depress the presser-bar 32. This bar has in it a slot 57 to allow the knife 33, which projects through a slot in the table 43, to also protrude from below through the cloth and into the slot, and owing to the angle at which the cutting edge of the knife is set relatively to the edge of the slot 57 a shearing-like action is obtained. As shown in Fig. 9, which is a side elevation of certain details, the disk knife 33 is keyed on a spindle 58, revolving in suitable bearings in the saddle 48. On the spindle 58 is also keyed a small pinion 59, gearing with a fixed rack 60 on the under side of the table 43. This causes the disk cutter 33 to revolve as it traverses, with the result that as the edge of the knife forms an angle with the edge of the groove 57 in the bar 32 a cutting action is also obtained, combined with the shearing action, or the rack 60 and pinion 59 may be dispensed with as the knife in passing through the cloth is thereby made to revolve as it travels, and where the rack and pinion are dispensed with instead of a disk cutter 33 an ordinary blade-knife may be used, as shown in Fig. 10, which is an elevation similar to Fig. 9.

In operation the presser-bar 32 is first raised and held up by the cams 50 51 acting through the levers 52 53 and rods 54 55. The measuring-rollers 27 28 are then rotated through the gearing 26, hereinbefore described, and deliver the determined length of cloth 30 and stop. The cams bring down the presser-bar. Then the knife 33 is made to traverse and rotate, as hereinbefore described, and the cloth is cut, the cycle of operations being repeated as long as the main shaft 12 is kept running.

Instead of a stationary rack 60 being employed to give the revolving motion to the knife 33 a pitch-chain 61 and sprocket-wheels 62 may be substituted therefor, as shown in Fig. 11, which is an elevation similar to Figs. 9 and 10, the wheels 62 being driven in an opposite direction to that of the wheels 45 47 through suitable gearing from the drum-shaft 41.

In order that with change-wheels for a specific length of cloth the amount of extra material necessary to be measured off to form a hem, for example, may be varied, a system of gearing in which separate sets of change-wheels are provided for measuring off the length of cloth and for measuring off an extra amount for the hem may be used, the arrangement also allowing of finer adjustment than the difference of two teeth, which of course is the least which can be obtained with the ordinary change-wheels hereinbefore described. Such a device comprises, essentially, an epicyclic train, which may be of any form, one member of which is connected to the measuring-rollers, the second member of which is driven by the gearing for the cloth measurement, and the third member of which is driven by gearing for the hem measurement. According to the example shown diagrammatically in plan in Fig. 12, Sheet 5, and in elevation in Fig. 13, Sheet 6, the epicyclic train is of the ordinary bevel type, the orbital pinions 65 of which are carried in a disk having a pinion 66, formed upon its edge. This disk is loose on a shaft 67, which has fixed to its outer end the bevel-wheel 68 of the epicyclic train. The second bevel-wheel 69 is carried on a sleeve 70, loose on this shaft, and there is also on this sleeve a pinion 71. To the shaft 67, to which is fixed the bevel-pinion 68, there is fixed the first pinion of a train of three 26, which drives the measuring-roller 28. The pinion 71 is driven from a pinion 72, carried on the shaft 21, which has on it the pinion 19, which gears with the interrupted spur-wheel 17. The pinions 71 and 72 gear with an intermediate pinion 73, which is so arranged that various sizes of pinions 72 may be used to give various ratios. The train of gearing just described is that for measuring off the cloth, and it operates as follows, supposing in the meantime that the disk-pinion 66 be held stationary: The pinion 72 through the intermediate pinion 73 drives the pinion 71, this pinion 71 being connected to the bevel-pinion 69 by the sleeve 70. It through the orbital pinions 65, carried in the disk-pinion 66, rotates the other bevel-pinion 68 of the epicyclic train in the opposite direction. This bevel-pinion 68 being fast on the shaft 67 rotates that shaft, and so the first pinion, fast on that shaft, of the train 26, driving the measuring-rollers.

It will be seen that if the disk-pinion 66 is slowly rotated in the opposite direction to the bevel-wheel 69 that the speed in the opposite direction to the bevel-wheel 69 of the other bevel-wheel 68 will be enhanced—that is, there will be a constant percentage of addition to its movement. This percentage of addition constitutes the hemming-measurement and is brought about by the following gearing: Upon the shaft 21 there is fixed a worm 74, which gears with a worm-wheel 75, fixed on a diagonal shaft 76, which carries at its other end a bevel-wheel 77, gearing with a like wheel 78 on a short shaft 79, having on it a pinion 80 gearing through an intermediate pinion 81 with the disk-pinion 66.

By this means a comparatively slow rotatory movement is given to the disk-pinion. The pinions 80 and 81 are so arranged that different sizes may be used to vary the percentage of addition for the hemming-measurement.

Our improved mechanism for giving a reciprocating and rotatory motion to a disk-cutter or a reciprocating motion to a blade-knife may be used in conjunction with known forms of machines in which the presser-bar is actuated by hand or foot power, for example, with or without means for mechanically drawing out and measuring off the length of cloth to be cut. Also our improved measuring mechanism may be used with other known forms of cutting mechanism.

What we claim is—

1. In a machine for measuring and cutting cloth, and the like, in combination, a main shaft driven continuously, measuring and horizontally-reciprocating cutting mechanism, and gearing for intermittently and alternately actuating such mechanism from the continuously-running shaft.

2. In a machine for measuring and cutting cloth, and the like, a main shaft, a spur-wheel thereon, and through which it is continuously driven, two partially-toothed wheels carried by the spur-wheel, measuring and cutting-shafts, pinions thereon gearing with the partially-toothed wheels, grooves in the spur-wheel and studs on the pinions capable of sliding in the grooves, measuring-rollers, changeable gear driving such rollers from the measuring-shaft, a table, a knife running in a slot therein, gearing operating the knife from the cutting-shaft and a cam-operated slotted presser-bar working above the table.

3. In a machine for measuring and cutting cloth, and the like, a disk knife and mechanism for intermittently giving a reciprocating and also a rotatory motion thereto in combination with means for drawing out and measuring off the length of cloth to be cut and for holding the cloth while being cut.

4. In a machine for measuring and cutting cloth, and the like, a table over which the material to be cut is passed, a saddle slidable in a rail on the table, a knife carried by the saddle, a slot in the table through which the knife protrudes, means for giving a rotatory motion to the knife, a drum-shaft, chains connecting the opposite ends of the saddle therewith, an intermittently-driven cutting-shaft gearing connecting the two shafts and consisting of bevel-gear actuating a crank-pin disk connected to a lever carrying a toothed sector-gearing with a pinion on the drum-shaft, and means for holding the cloth while being cut.

5. In a machine for measuring and cutting cloth, and the like, a table over which the material to be cut is passed, a saddle slidable in the table, a knife carried by the saddle, a slot in the table through which the knife protrudes, a drum-shaft, chains connecting the opposite ends of the saddle therewith, means for rotating the drum-shaft intermittently and alternately in opposite directions so as to give an intermittent reciprocatory motion to the knife and means for holding the cloth while being cut.

6. In a machine for measuring and cutting cloth and the like, cloth-measuring gear comprising measuring-rollers, intermittently-driven changeable gear including an epicyclic train, one member of which is connected to the measuring-rollers, the second member of which is actuated by the changeable gear, and the third member of which is also intermittently driven through changeable gear in combination with means for cutting the cloth.

7. In a machine for measuring and cutting cloth and the like, a measuring-roller, a changeable-gearing device for driving same, an epicyclic train in said gearing device and comprising a shaft geared to the measuring-roller, a disk-pinion loose upon the shaft changeable gearing for driving the disk, orbital pinions carried in the disk a bevel-pinion loose upon the shaft and gearing with the orbital pinions, a pinion fixed to the bevel-pinion changeable gearing driving that pinion a second bevel-pinion fast upon the shaft and also gearing with the orbital pinions and means for intermittently driving the changeable-gear device, as described in combination with means for cutting the cloth.

In testimony whereof we have signed our names to this specification each in the presence of two subscribing witnesses.

PETER SMITH SWAN.
NORMAN FRASER.

Witnesses to the signature of Peter Smith Swan:
JOHN B. CLARK,
JORDON WALLACE.

Witnesses to the signature of Norman Fraser:
DAVID FERGUSON,
WILFRED HUNT.